US008725349B2

(12) United States Patent
Horbatt

(10) Patent No.: US 8,725,349 B2
(45) Date of Patent: May 13, 2014

(54) REAR DEFOGGER CONTROL STRATEGY BASED ON A NUMBER OF VEHICLE OCCUPANTS

(75) Inventor: Kevin R. Horbatt, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/609,471

(22) Filed: Sep. 11, 2012

(65) Prior Publication Data

US 2014/0074351 A1     Mar. 13, 2014

(51) Int. Cl.
    *G06F 7/00*     (2006.01)
(52) U.S. Cl.
    USPC .......................................................... 701/36
(58) Field of Classification Search
    USPC .......................................................... 701/36
    See application file for complete search history.

(56) References Cited

U.S. PATENT DOCUMENTS

| 5,127,877 | A  | * | 7/1992 | Muller ........................... 454/126 |
| 8,209,073 | B2 | * | 6/2012 | Wijaya et al. ................... 701/22 |
| 2004/0195916 | A1 | * | 10/2004 | Katrak et al. ..................... 307/4 |
| 2010/0106363 | A1 | * | 4/2010 | Mandujano ....................... 701/36 |
| 2010/0138139 | A1 | * | 6/2010 | Gibert et al. ................... 701/112 |
| 2010/0268412 | A1 | * | 10/2010 | Mori et al. ....................... 701/33 |

FOREIGN PATENT DOCUMENTS

JP     2004-210152     *  7/2004

OTHER PUBLICATIONS

Tatsuro et al., Jul. 2004, Translation of JP 2004-210152.*

* cited by examiner

*Primary Examiner* — Mary Cheung
*Assistant Examiner* — Frederick Brushaber
(74) *Attorney, Agent, or Firm* — Cantor Colburn LLP

(57) ABSTRACT

A defogger system for a vehicle is provided. The defogger system includes an occupant module receiving an occupant signal indicative of a number of occupants located within the vehicle. The occupant module determines a compensation factor based on the number of occupants located within the vehicle. The defogger system includes a defogger timer for determining a preliminary defogger signal that indicates a preliminary amount of time. The defogger system includes a final timer module that receives the compensation factor and the preliminary defogger signal. The final timer module determines a timer signal that indicates an amount of time that a defogger remains activated.

20 Claims, 2 Drawing Sheets

US 8,725,349 B2

REAR DEFOGGER CONTROL STRATEGY BASED ON A NUMBER OF VEHICLE OCCUPANTS

FIELD OF THE INVENTION

Exemplary embodiments of the invention relate to a defogger system for a vehicle and, more particularly, to a defogger system that indicates an amount of time the defogger remains activated based on a number of occupants in the vehicle.

BACKGROUND

Rear defoggers located on a vehicle backglass or rear windshield may include a series of resistive conductors located in or on the rear windshield. When electrical power is applied, the resistive conductors are activated or heated to evaporate condensation from the rear windshield. Generally during a drive cycle, the resistive conductors are supplied electrical power for a predetermined amount of time (e.g., generally between about 10-20 minutes), and electrical power is then turned off to conserve electrical energy and improve fuel economy.

In some types of vehicles, that rear windshield tends to fog up relatively quickly once the electrical power is turned off. Thus, a driver may need to turn on or activate the rear defogger relatively often, which in turn may cause annoyance or irritation. In particular, the rear windshield tends to fog up more quickly if the number of occupants in the vehicle increases. In one approach, a humidity sensor may be provided to determine the humidity within the interior cabin of the vehicle. The electrical power provided to the resistive conductors may be activated based on the humidity reading from the humidity sensor. However, the humidity sensor may also generate inaccurate readings during the early stages of the drive cycle. Accordingly, it is desirable to provide a cost-effective and efficient system that cycles the rear defogger on and off during a drive cycle.

SUMMARY OF THE INVENTION

In one exemplary embodiment of the invention, a defogger system for a vehicle is provided. The defogger system includes an occupant module receiving an occupant signal indicative of a number of occupants located within the vehicle. The occupant module determines a compensation factor based on the number of occupants located within the vehicle. The defogger system includes a defogger timer for determining a preliminary defogger signal that indicates a preliminary amount of time. The defogger system includes a final timer module that receives the compensation factor and the preliminary defogger signal. The final timer module determines a timer signal that indicates an amount of time that a defogger remains activated.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
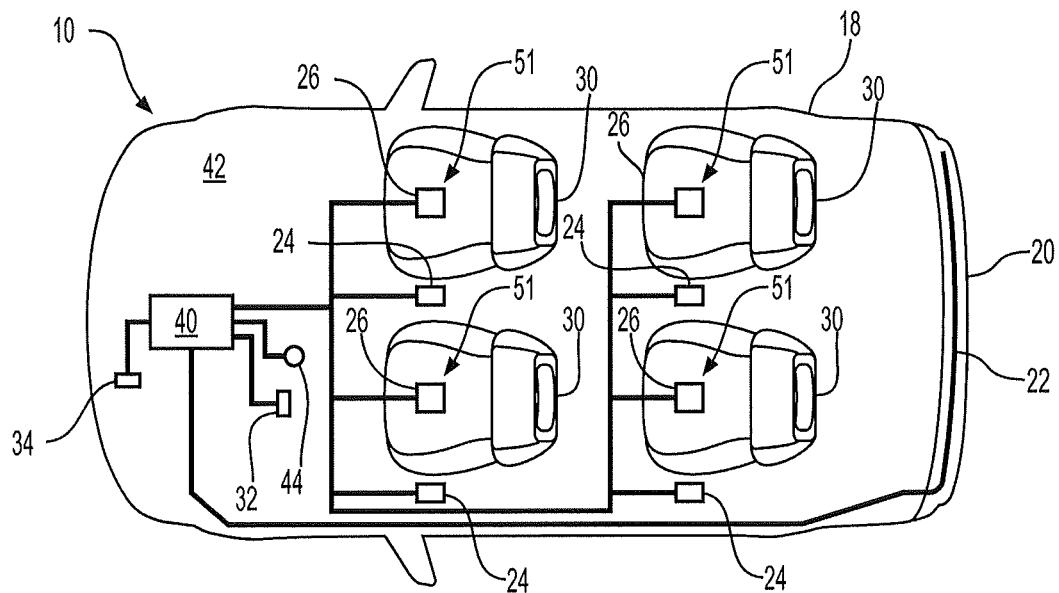
FIG. 1 is a schematic illustration of a vehicle having a defogger system.

Referring now to FIG. 1, an exemplary embodiment is directed to a defogger system 10 for a vehicle 18. The defogger system 10 includes a rear windshield 20, a series of resistive conductors 22 located in or along the rear windshield 20, a plurality of seatbelt switches or sensors 24, a plurality of occupant sensors 26 that are each located within a corresponding seat 30, a humidity sensor 32, an outside air or ambient temperature sensor 34, and a control module 40. It should be noted that although FIG. 1 is directed to a rear defogger system 10 (e.g., to clear condensation on the rear windshield 20 of the vehicle 18) it is understood that the defogger system 10 may be used on any other window (e.g., front or side windows) of the vehicle 18 as well. The resistive conductors 22 are activated or heated as electrical power is applied to evaporate condensate on the rear windshield 20.

The defogger system 10 regulates an amount of time that the resistive conductors 22 are activated to heat the rear windshield 20. Specifically, the amount of time the resistive conductors 22 remain activated is based on a number of occupants located within an interior cabin 42 of the vehicle 18. That is, when an occupant located within the vehicle 18 activates the defogger system 10 (e.g., by a button or knob 44), the resistive conductors 22 remain activated for a predetermined amount of time.

In the exemplary embodiment as shown in FIG. 1, the vehicle 18 includes four seats 30, however it is to be understood that fewer or more seats may be included as well. Each seat includes one of the occupant sensors 26 located along a bottom portion 51 of the seat 30. The occupant sensors 26 indicate the presence of an occupant within the seat 30 based on pressure or electrical capacitance. Each seat 30 is associated with one of the seatbelt sensors 24. Each seatbelt sensor 24 indicates if a seatbelt (not shown) corresponding to the seat 30 is latched. It should be noted that while FIG. 1 illustrates both seatbelt sensors 24 and occupant sensors 26 corresponding to the seats 30, only one set of sensors (e.g., either the seatbelt sensors 24 or the occupant sensors 26) may be needed.

The ambient temperature sensor 34 is used to determine an ambient or outside air temperature. In one embodiment, the ambient temperature sensor 34 may be positioned proximate a front grille (not shown) of the vehicle 18, however, it is understood that the ambient temperature sensor 34 may be positioned in other locations as well. The humidity sensor 32 is located within the interior cabin 42 and determines the humidity of the interior cabin 42 of the vehicle 18. Specifically, in one embodiment, the humidity sensor 32 may be located along a front dashboard (not illustrated) of the vehicle 18.

Figure 2:
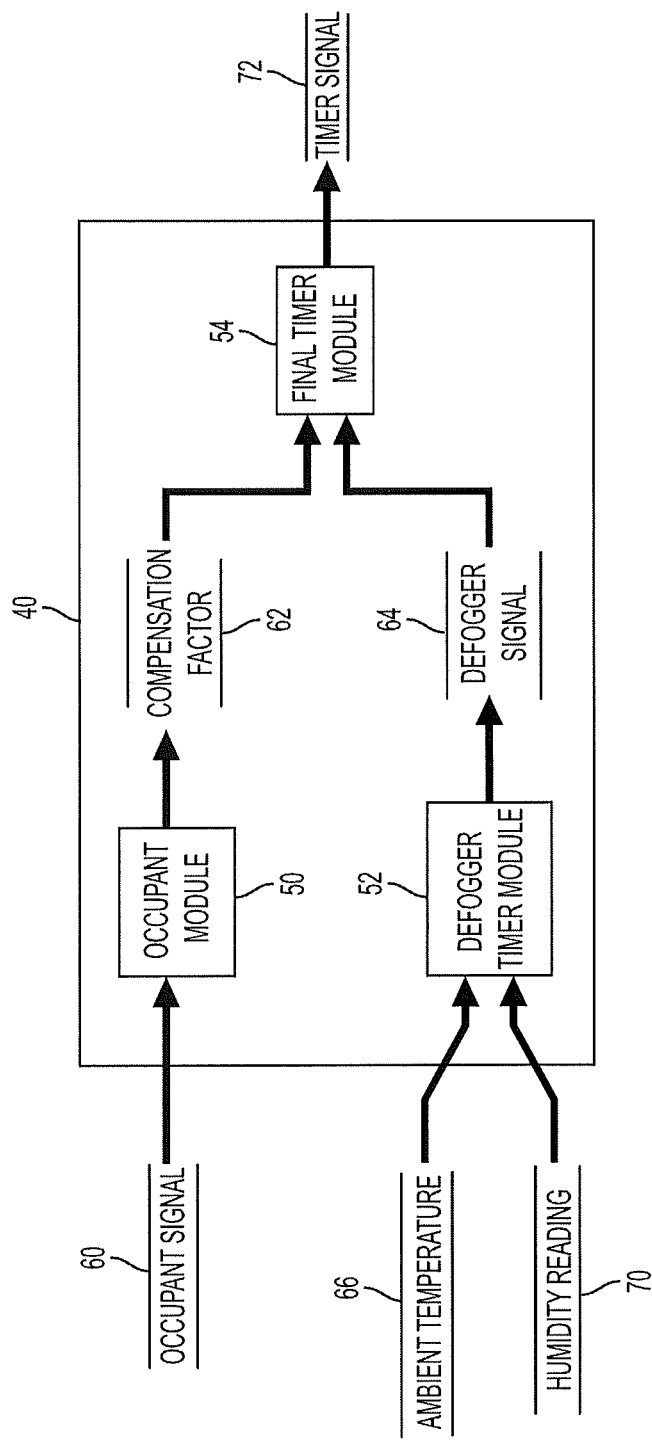
FIG. 2 is an illustration of a control module shown in FIG. 1.

The control module 40 is in communication with the series of resistive conductors 22, the seatbelt sensors 24, the occupant sensors 26, the humidity sensor 32, the ambient temperature sensor 34, and the knob 44. Turning now to FIG. 2, a dataflow diagram illustrates an exemplary embodiment of the control module 40. In various embodiments, the control module 40 may include one or more sub-modules and datastores. In the exemplary embodiment as shown in FIG. 2, the control module 40 includes an occupant module 50, a defogger timer module 52, and a final timer module 54.

The occupant module 50 receives as input at least one occupant signal 60 indicating the presence of an occupant located within the interior cabin 42 of the vehicle 18 (shown in FIG. 1). In one embodiment, the occupant signal 60 indicating the presence of an occupant may be generated by one of the occupant sensors 26 (shown in FIG. 1). Specifically, for example, if four occupants are present within the interior cabin 42, then the occupant module 50 would receive four occupant signals 60. Alternatively, in another embodiment, the occupant signal 60 indicating the presence of an occupant may be generated by one or more of the seatbelt sensors 24. The occupant module 50 determines a compensation factor 62 based on the number of occupants located within the interior cabin 42. The compensation factor 62 is directly related to the number of occupants located within the interior cabin 42. Specifically, if the number of occupants located within the interior cabin 42 increases, so does the compensation factor 62.

The defogger timer module 52 determines a preliminary defogger signal 64 that indicates a preliminary amount of time that the series of resistive conductors 22 (shown in FIG. 1) remain activated. The defogger timer module 52 receives as an input an ambient temperature 66 (e.g., from the ambient temperature sensor 34 shown in FIG. 1), and determines the preliminary defogger signal 64 based on the input. In one embodiment, the input to the defogger timer module 52 may also include a humidity reading 70 (e.g., from the humidity sensor 32 shown in FIG. 1), where the preliminary defogger signal 64 is further based on the humidity reading 70 as well.

The final timer module 54 receives as input the compensation factor 62 and the preliminary defogger signal 64, and determines a timer signal 72 based on the inputs. The timer signal 72 represents the predetermined amount of time that the defogger system 10 will keep the resistive conductors 22 activated. In one embodiment, the timer signal 72 is determined by multiplying the compensation factor 62 with the preliminary defogger signal 64, however it is understood that other approaches may be used as well to determine the timer signal 72. In one embodiment, the timer signal 72 may also be based on the number of times an occupant located within the vehicle 18 activates the defogger system 10 (e.g., by the button or knob 44 shown in FIG. 1) during a drive cycle. For example, the first time the defogger system 10 is activated, the predetermined amount of time of the timer signal 72 may be set to about 15 minutes. However, if the defogger system 10 is subsequently activated during the same drive cycle, the predetermined amount of time that the defogger system 10 is activated may be adjusted to balance electrical energy consumption and system performance.

The timer signal 72 is based on the compensation factor 62, and therefore takes into account the number of occupants located within the interior cabin 42. Thus, if the number of occupants located within the interior cabin 42 increases, so does the predetermined amount of time that the resistive conductors 22 will remain activated. As a result, a driver of the vehicle 18 may not need to repeatedly activate the resistive conductors 22 of the defogger system 10, especially if there are multiple occupants located within the interior cabin 42.

Figure 3:
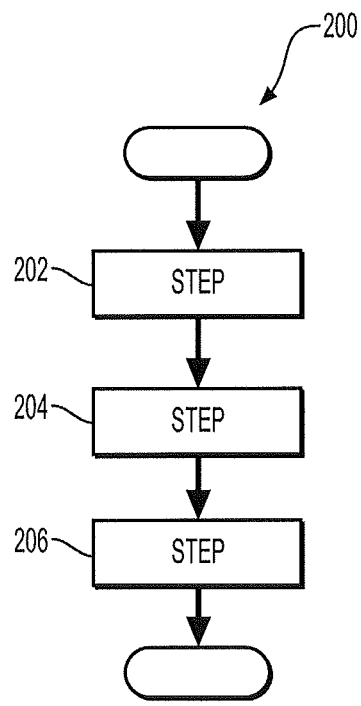
FIG. 3 is a process flow diagram illustrating an exemplary approach for determining a timer signal.

FIG. 3 is an exemplary process flow diagram illustrating a method 200 of determining the timer signal 72 of the defogger system 10. Referring generally to FIGS. 1-3, method 200 may begin at step 202. In step 202, the occupant module 50 of the control module 40 determines the compensation factor 62 based on the number of occupants located within the interior cabin 42. The number of occupants may be determined using either the occupant sensors 26 or the seatbelt sensors 24. Method 200 may then proceed to step 204.

In step 204, the defogger timer module 52 of the control module 40 determines the preliminary defogger signal 64. The preliminary defogger signal 64 is based on the ambient temperature 66. In one embodiment, the preliminary defogger signal 64 may also be based on the humidity reading 70 as well. Method 200 may then proceed to step 206.

In step 206, the final timer module 54 determines the timer signal 72 based on the compensation factor 62 and the preliminary defogger signal 64. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A non-transitory defogger system for a vehicle, comprising:
an occupant module implemented by at least one processor and configured to:
receive an occupant signal indicative of a number of occupants located within the vehicle; and
determine a compensation factor based on the number of occupants located within the vehicle;
a defogger timer module implemented by the at least one processor and configured to determine a preliminary defogger signal that indicates a preliminary amount of time; and
a final timer module implemented by the at least one processor and configured to:
receive the compensation factor and the preliminary defogger signal;
determine, based on the compensation factor and the preliminary defogger signal, a timer signal that indicates an amount of time that a defogger remains activated; and
adjust the timer signal based on a number of times the defogger is activated during a same drive cycle.

2. The non-transitory defogger system of claim 1, wherein the final timer module is configured to determine the timer signal by multiplying the compensation factor with the preliminary defogger signal.

3. The non-transitory defogger system of claim 1, wherein the compensation factor increases with the number of occupants located within the vehicle.

4. The non-transitory defogger system of claim 1, wherein the occupant signal is generated by a plurality of seatbelt sensors.

5. The non-transitory defogger system of claim 1, wherein the occupant signal is generated by a plurality of occupant sensors, wherein each of the plurality of occupant sensors is located in a corresponding seat.

6. The non-transitory defogger system of claim 1, wherein the defogger timer module is further configured to receive as input a temperature signal that is indicative of an ambient temperature, wherein the defogger timer is configured to determine the preliminary defogger signal based on the ambient temperature.

7. The non-transitory defogger system of claim 6, wherein the defogger timer module is further configured to receive as input an interior cabin humidity reading, wherein the defogger timer module is configured to determine the preliminary defogger signal based on the interior cabin humidity reading.

8. The non-transitory defogger system of claim 1, wherein the defogger is a rear defogger for a rear windshield of the vehicle.

9. A vehicle having a defogger system comprising:
an ambient temperature sensor for detecting an ambient temperature; and
a control module implemented in at least one processor and in communication with the ambient temperature sensor, the control module comprising:
an occupant module configured to:
receive an occupant signal indicative of a number of occupants located within the vehicle; and
determine a compensation factor based on the number of occupants located within the vehicle;
a defogger timer module configured to determine a preliminary defogger signal that indicates a preliminary amount of time, the preliminary defogger signal based on the ambient temperature; and
a final timer module configured to:
receive the compensation factor and the preliminary defogger signal;
determine, based on the compensation factor and the preliminary defogger signal, a timer signal that indicates an amount of time that a defogger remains activated; and
adjust the timer signal based on a number of times the defogger is activated during a same drive cycle.

10. The vehicle of claim 9, wherein the final timer module is configured to determine the timer signal by multiplying the compensation factor with the preliminary defogger signal.

11. The vehicle of claim 9, wherein the compensation factor increases with the number of occupants located within the vehicle.

12. The vehicle of claim 9, wherein the occupant signal is generated by a plurality of seatbelt sensors.

13. The vehicle of claim 9, wherein the occupant signal is generated by a plurality of occupant sensors, wherein each of the plurality of occupant sensors is located in a corresponding seat.

14. The vehicle of claim 9, wherein the defogger timer module is further configured to receive as input an interior cabin humidity reading, wherein the defogger timer module is configured to determine the preliminary defogger signal based on the interior cabin humidity reading.

15. A method of determining an amount of time that a defogger for a vehicle remains activated, comprising:
receiving an occupant signal indicative of a number of occupants located within the vehicle by an occupant module implemented in at least one processor;
determining a compensation factor based on the number of occupants located within the vehicle by the occupant module implemented in the at least one processor;
determining a preliminary defogger signal that indicates a preliminary amount of time by a defogger timer module implemented in the at least one processor;
determining a timer signal that indicates the amount of time that a defogger remains activated by a final timer module implemented in the at least one processor, wherein the timer signal is based on the compensation factor and the preliminary defogger signal; and
adjusting the timer signal by the final timer module implemented in the at least one processor, based on a number of times the defogger is activated during a same drive cycle.

16. The method of claim 15, wherein the determining the timer signal comprises multiplying the compensation factor with the preliminary defogger signal.

17. The method of claim 15, wherein the compensation factor increases with the number of occupants located within the vehicle.

18. The method of claim 15, wherein the occupant signal is generated by a plurality of seatbelt sensors.

19. The method of claim 15, wherein the occupant signal is generated by a plurality of occupant sensors, wherein each of the plurality of occupant sensors is located in a corresponding seat.

20. The method of claim 15 further comprising receiving as input a temperature signal that is indicative of an ambient temperature by the defogger timer module, wherein the determining the preliminary defogger signal comprises determining the preliminary defogger signal based on the ambient temperature.

* * * * *